United States Patent [19]
McCachren

[11] 3,884,543
[45] May 20, 1975

[54] APPLIANCE CORD ANCHOR

[75] Inventor: Gary S. McCachren, Asheboro, N.C.

[73] Assignee: General Electric Company, Bridgeport, Conn.

[22] Filed: Mar. 14, 1974

[21] Appl. No.: 451,070

[52] U.S. Cl. .............................. 339/105; 339/103 R
[51] Int. Cl. .............................................. H01r 13/58
[58] Field of Search .... 339/105, 106, 103 C, 103 R; 74/569

[56] References Cited
UNITED STATES PATENTS

| | | | |
|---|---|---|---|
| 1,964,350 | 6/1934 | Greene | 339/106 X |
| 1,974,297 | 9/1934 | Benander | 74/569 X |
| 2,902,536 | 9/1959 | Huth | 339/106 X |
| 3,218,435 | 11/1965 | Mandziak | 339/103 R X |

FOREIGN PATENTS OR APPLICATIONS 9,549  5/1899  United Kingdom................. 339/105

*Primary Examiner*—Roy Lake
*Assistant Examiner*—DeWalden W. Jones
*Attorney, Agent, or Firm*—John F. Cullen; George R. Powers; Leonard J. Platt

[57] ABSTRACT

An improved means for anchoring a cord to an electric device such as an appliance where the cord is slit and the separated conductors are connected to internal terminals inside the housing of the device. The invention provides a cord opening into the device with a cross member fixed to and straddling the opening on the inside of the device with the cross member being preferably narrower than the opening on the inside so that the slit cord can be pushed into the opening to bottom on the cross member with a conductor on each side thereof. The conductors are then tied over the cross member before being connected to the terminals whereby the cord cannot be pushed into or pulled out of the housing. The entire device may be of a molded plastic with a boss containing the opening and the cross member in the housing all being integrally formed in one piece.

7 Claims, 4 Drawing Figures ary, Inc. approval. Thus, as is well-known, it is necessary to anchor the cord with a strain relief so that no

3,884,543

1
APPLIANCE CORD ANCHOR

BACKGROUND OF THE INVENTION

1. Field of the Invention:

The invention relates to an improved means for anchoring a cord to an appliance housing wherein the entire anchoring means can be molded in the housing and the cord is restrained from being pushed into or pulled out of the housing by simply putting it in place and tying it.

2. Description of the Prior Art:

Many portable electrical appliances today are cord-operated as opposed to battery-operated. The cords are of various materials and generally comprise the common two conductor lamp-type cord, plastic coated, and which consists of a flat extrusion including a connecting web that is ripped easily to separate the conductors for connection to the internal terminals in the device. Additionally, in electric appliances, various parameters must be met to qualify for Underwriters' Laboratory, Inc. approval. Thus, as is well-known, it is necessary to anchor the cord with a strain relief so that no stress is applied to the terminals. A typical cord-connecting structure to meet stringent requirements in an iron is shown in U.S. Pat. No. 3,858,160, of common assignment as illustrative of an arrangement of molded pieces to provide strain relief without using extra parts. The anchor herein contemplated is not subject to such strict requirements as in irons, however, it is desired that the anchoring means use as few parts as possible, be inexpensive, and require a minimum amount of labor in assembly all directed to keeping the costs down. An improved and simplified cord anchor is desired that meets these requirements.

SUMMARY OF THE INVENTION

Briefly described, the invention is directed to an electric device such as an appliance cord-connected to internal terminals by a slit portion having separated conductors connected to the terminals. An improved means of anchoring the cord to the appliance comprises a cord opening into the appliance, with a cross member fixed to and straddling the opening on the inside of the appliance. The opening preferably extends beyond the cross member on each side thereof and the opening may conveniently be formed through a boss that forms part of the appliance housing. The entire structure may be formed of plastic whereby the housing, the boss, the opening, and the cross member are all integrally molded as one piece whereby the slit cord is pushed into the opening to bottom on the cross member with a conductor on each side thereof for tying over the cross member before connecting to the terminals thereby limiting the ingress and egress of the cord to and from the housing with no additional parts.

2
DESCRIPTION OF THE PREFERRED EMBODIMENT

Figure 1:
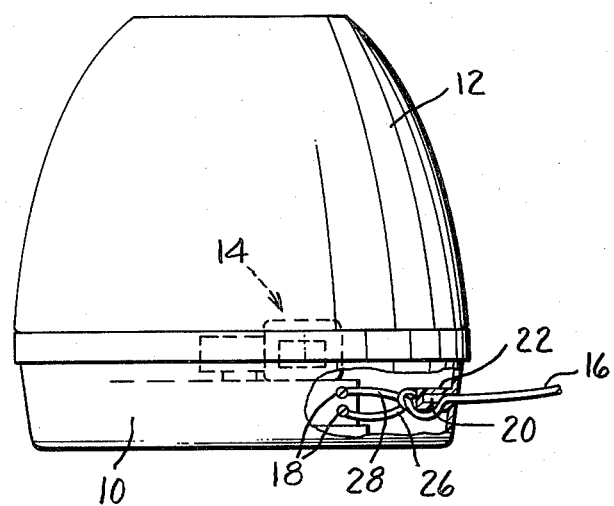
FIG. 1 is a general outline, partially broken, of a typical electric appliance where the cord anchor may be used as applied to the housing side for clarity.

The invention is applicable to any cord-connected electric device regardless of the material used and will be described in connection with an electric appliance such as a hair dryer wherein the parts are of molded plastic as is well-known. Also, the invention is applicable to plural conductor cords including those with a grounding conductor as will be apparent but is described in connection with the more common dual conductor cord. Referring firt to FIG. 1, there is shown the outline of a common hard hat or hard bonnet hair dryer of the general type shown in U.S. Pat. No. 3,777,406 of common assignment. It generally includes a base assembly 10, a rigid hood assembly 12 and a connecting supporting and air-carrying duct not shown between the hood and base whereby the dryer may be opened into operative position in a well-known manner. The base assembly 10 includes a housing which contains the usual means for producing a flow of heated air and an electric motor for rotating a fan, the heating and fan assembly being generally indicated at 14. The hair dryer is electrically operated by a suitable cord 16 that generally is formed of a flat extrusion with a connecting web, like the well-known lamp cord, so the individual conductors can be slit or ripped easily to separate them for connection to the internal terminals 18 to provide power to the appliance in a well-known manner.

It is desirable, and necessary, that cord 16 be connected through base assembly 10 so that it may not be pushed into the base while, at the same time, being firmly anchored so that it cannot put stress on terminals 18 by pulling on the cord. It has been customary to provide various cord anchors usually using clamps in one form or another. Sometimes it is merely necessary to tie a knot in the conductors on the inner surface of the housing so the cord cannot be pulled out and then provide some covering cap or means so the cord cannot be pushed into the housing. These arrangements usually require extra parts and entail a relatively longer and thus costlier assembly operation.

In accordance with the invention, an improved means to anchor the cord to the appliance comprises a cord opening 20 directly through the housing wall of the base assembly 10. While any suitable opening location is satisfactory, it is convenient to provide a tube or boss 22 to provide some depth so the opening is through the boss as will be explained. Since the various housing assemblies 10 and 12 as well as other parts are formed of molded plastic in appliance applications, it can be seen that the boss 22 may be formed directly as part of the molding. Of course, it, and other parts to be described, can be formed separately and secured as will be obvious although, in actual practice for the application shown herein, the parts are all of one-piece molded plastic formed directly on the housing bottom (FIGS. 3–4) thus requiring no additional parts or assembly.

Figure 3:
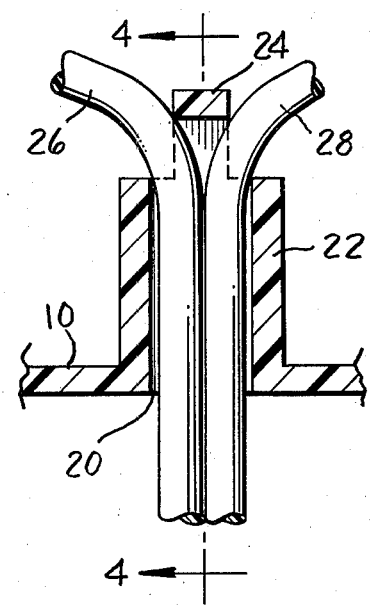
FIG. 3 is a partial cross-sectional view on line 3—3 of FIG. 2.
Figure 2:
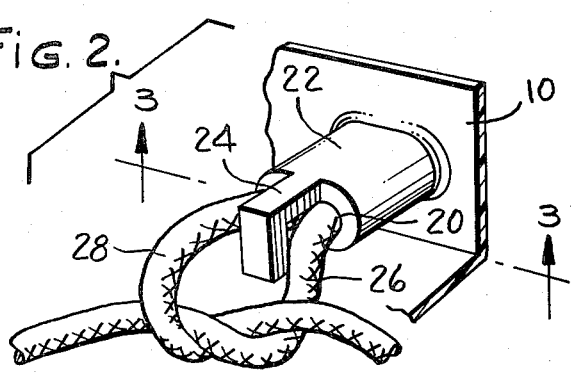
FIG. 2 is a partial perspective of the inside of the housing showing the assembly of the anchor.
Figure 4:
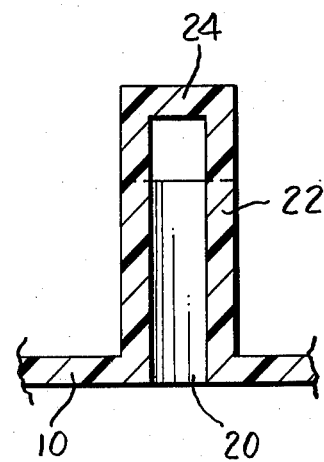
FIG. 4 is a partial cross-sectional view of the boss and cross member taken on line 4—4 of FIG. 3.

In order to limit inward and outward motion of the cord, a suitable cross member 24 is fixed to, by being molded as a part of, the boss and straddles the opening 20 on the inside of the appliance as clearly shown on FIG. 2. Because the cross member tends to block the cord, the opening 20 preferably extends beyond the cross member on each side thereof so that the individual conductors 26, 28 can be pulled through the boss and out on each side of the cross member as shown in FIGS. 2 and 3. The cross member may take any form and can be a convenient molded extension of the boss on the inner end thereof as shown. Clearly, opening 20 need only provide a conductor exit on each side of the straddled cross member 24 as shown although it is more difficult to feed the conductors through if member 24 is wider than opening 20. Thus, the preferred form of FIG. 3 extends opening 20 beyond the cross member 24 for easy manipulation of the conductors.

In assembly, the customary cord is slit to provide a portion having the separated conductors 26 and 28 for eventual connection to internal terminals 18 and the slit cord is pushed into opening 20 with the boss being sized to accommodate the entire slit portion of the cord so that it jams or bottoms on the cross member 24, as shown in FIGS. 2 and 3, to thereby limit ingress of the cord into the base assembly 10. The assembler then merely knots the cord or ties it over the cross member 24 as shown in FIGS. 1 and 2 and then makes the connection to internal terminals 18. The tied knot over the cross member before the terminals then prevents the cord from being pulled out or prevents egress of the cord from the assembly. By using a boss 22 of suitable length the opening then has a depth sufficient to accommodate the slit portion of the cord so that an integral cord exits the base assembly.

It can be seen that this relatively simple appliance cord anchor may be of all molded parts with the plastic housing having its boss, opening, and cross member all integrally molded as one piece on the housing thus requiring no extra parts. It is then very simple to assemble requiring only two steps of pushing the cord into the base assembly to bottom and then tying the separated conductors tightly over the cross member 24 whereby the cord is firmly anchored in a manner that meets all the requirements and requires no additional parts other than a slight extension of the usual opening 20 which extension may be molded right into the base assembly.

While there has been described a preferred form of the invention, obvious equivalent variations are possible in light of the above teachings. It is therefore to be understood that, within the scope of the appended claims, the invention may be practised otherwise than as specifically described, and the claims are intended to cover such equivalent variations.

I claim:

1. In an electric device cord-connected to internal terminals by a slit portion having separated conductors connected to the terminals, an improved means anchoring the cord to the device comprising,
    a cord opening to said device,
    a cross member fixed to and straddling the opening on the inside of the device,
    whereby the slit cord is pushed into the opening to bottom on the cross member with a conductor on each side thereof for tying over the cross member before said terminals to limit ingress and egress of said cord.

2. Apparatus as described in claim 1 wherein the opening has a depth sufficient to accommodate all the slit portion of the cord.

3. Apparatus as described in claim 1 wherein the cross member is molded into the housing of the electric device to be integral therewith.

4. Apparatus as described in claim 3 wherein a boss is molded into the housing of the device and the cord opening is through the boss.

5. Apparatus as described in claim 4 wherein the cross member is molded into said boss on the inner end thereof.

6. Apparatus as described in claim 5 wherein said boss is sized to accommodate all the slip portion of the cord.

7. Apparatus as described in claim 6 wherein said device is an electric appliance with a plastic housing and having said boss, opening, and cross member all integrally molded as one piece to said housing.

* * * * *